(12) United States Patent
Kim (10) Patent No.: US 9,244,633 B2
(45) Date of Patent: Jan. 26, 2016

(54) IMAGE FORMING APPARATUS AND METHOD OF CONTROLLING WIRELESS NETWORK CONNECTION IN THE APPARATUS

(75) Inventor: Jin-Hyung Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 971 days.

(21) Appl. No.: 12/794,833

(22) Filed: Jun. 7, 2010

(65) Prior Publication Data

US 2011/0122434 A1 May 26, 2011

(30) Foreign Application Priority Data

Nov. 20, 2009 (KR) .................. 10-2009-0112811

(51) Int. Cl.
 *G06F 3/12* (2006.01)

(52) U.S. Cl.
 CPC ............ *G06F 3/1203* (2013.01); *G06F 3/1236* (2013.01); *G06F 3/1292* (2013.01)

(58) Field of Classification Search
 CPC ..... H04W 28/18; H04W 36/14; H04W 48/18; H04W 84/12; H04W 84/18; H04W 88/06; H04W 76/02; G06F 3/1203; G06F 3/1236; G06F 3/1292
 USPC ........ 370/338; 455/41.2, 41.3, 103, 230, 410, 455/411, 418–420, 432.3, 435.2, 552.1, 455/553.1, 556.1, 556.2, 557
 See application file for complete search history.

(56) References Cited

U.S. PATENT DOCUMENTS

| 7,672,278 B2 | 3/2010 | Gassho et al. |
| 2005/0270989 A1 | 12/2005 | Park et al. |

(Continued)

FOREIGN PATENT DOCUMENTS

| JP | 2003-163668 | 6/2003 |
| KR | 10-2005-0114886 | 12/2005 |

OTHER PUBLICATIONS

Office Action issued in Korean Application No. 10-2009-0112811 on Apr. 24, 2014.

(Continued)

*Primary Examiner* — San Htun
*Assistant Examiner* — Erica Navar
(74) *Attorney, Agent, or Firm* — Staas & Halsey LLP (57) ABSTRACT

An image forming apparatus in which connection of an external device and a wireless network is controlled, the image forming apparatus including: a wireless network interface unit to connect the image forming apparatus to a first wireless network or a second wireless network; a user interface unit in which setting a connection configuration to connect the image forming apparatus to the second wireless network according to a request to connect to the second wireless network is performed while the image forming apparatus is connected to the first wireless network; a determining unit to determine whether connection of the second wireless network is terminated after connection of the first wireless network is terminated and the image forming apparatus is connected to the second wireless network according to the set connection configuration; and a controller, as a result of the determining, if connection of the second wireless network is terminated, to control so that the image forming apparatus is connected to a different wireless network from the second wireless network according to the set connection configuration.

18 Claims, 7 Drawing Sheets

(56) References Cited

U.S. PATENT DOCUMENTS

| | | | |
|---|---|---|---|
| 2006/0058059 A1* | 3/2006 | Kim | 455/550.1 |
| 2006/0104200 A1* | 5/2006 | Park | 370/216 |
| 2006/0221858 A1* | 10/2006 | Switzer et al. | 370/254 |

OTHER PUBLICATIONS

Korean Notice of Allowance issued Oct. 13, 2014 in corresponding Korean Patent Application No. 10-2009-0112811.

* cited by examiner

IMAGE FORMING APPARATUS AND METHOD OF CONTROLLING WIRELESS NETWORK CONNECTION IN THE APPARATUS

CROSS-REFERENCE TO RELATED APPLICATIONS

This application claims the benefit of Korean Patent Application No. 10-2009-0112811, filed on Nov. 20, 2009, in the Korean Intellectual Property Office, the disclosure of which is incorporated herein in its entirety by reference.

BACKGROUND

1. Field of the Invention

The present general inventive concept relates to an image forming apparatus and a method of controlling a wireless network connection in the image forming apparatus.

2. Description of the Related Art

Image forming apparatuses include office automation (OA) devices such as multifunctional devices that perform office functions of a printer, a copying machine, a scanner, and a fax in one device. Recently, devices that do not use a wired means, but use an ultra-high-speed wireless network, have been gradually widely used in daily life. Image forming apparatuses such as multifunctional devices can scan a document, generate scan data, and transmit the generated scan data to a wireless network. Also, these image forming apparatuses can transmit a document that is edited using a computer to a multifunctional device via the wireless network and print the document. In other words, the image forming apparatuses that support a document transmission via the wireless network have been widely used.

SUMMARY

The present general inventive concept provides an image forming apparatus and a method to control a wireless network connection in the image forming apparatus.

Additional features and/or utilities of the present general inventive concept will be set forth in part in the description which follows and, in part, will be apparent from the description, or may be learned by practice of the general inventive concept.

Embodiments of the present general inventive concept provide an image forming apparatus in which connection of an external device and a wireless network is controlled, the image forming apparatus including: a wireless network interface unit to connect the image forming apparatus to a first wireless network or a second wireless network; a user interface unit in which setting a connection configuration to connect the image forming apparatus to the second wireless network according to a request for connection to the second wireless network is performed while the image forming apparatus is connected to the first wireless network; a determining unit to determine whether connection of the second wireless network is terminated after connection of the first wireless network is terminated and the image forming apparatus is connected to the second wireless network according to the set connection configuration; and a controller to control, as a result of the determining if connection of the second wireless network is terminated, so that the image forming apparatus is connected to a different wireless network from the second wireless network according to the set connection configuration.

Embodiments of the present general inventive concept also provide a method of controlling wireless network connection in an image forming apparatus in which connection of an external device and a wireless network is controlled, the method including: connecting the image forming apparatus to a first wireless network; setting a connection configuration to connect the image forming apparatus to a second wireless network according to a request to connect to the second wireless network; terminating connection of the first wireless network according to the set connection configuration and connecting the image forming apparatus to the second wireless network; determining whether connection of the second wireless network is terminated after the image forming apparatus is connected to the second wireless network; and if connection of the second wireless network is terminated according to a result of the determining, connecting the image forming apparatus to a different wireless network from the second wireless network according to the set connection configuration.

Embodiments of the present general inventive concept also provide an image forming apparatus, including: a wireless network interface unit to wirelessly connect the image forming apparatus to and switch between a plurality of wireless networks; a determination unit to determine whether a connection configuration to connect the wireless network interface unit to a particular wireless network has been set, and if the connection configuration has been set, to determine if the connection configuration has been satisfied; and a controller to control connection of the wireless network interface unit to a different wireless network than the particular wireless network when it is determined that the connection configuration has been satisfied.

The setting a connection configuration may include at least one of setting an operation mode of the wireless network interface unit in which the image forming apparatus is temporarily connected to the wireless network; setting conditions for terminating connection of the temporarily-connected wireless network by changing the operation mode; and setting information about a wireless network to be newly connected to the image forming apparatus after the connection of the temporarily-connected wireless network is terminated.

The setting conditions for terminating connection of the temporarily-connected wireless network may include at least one of setting an available time of the image forming apparatus while being connected to the particular wireless network, setting the number of pages of a printing medium that can be printed by the image forming apparatus, setting a fee to be paid by a user of the particular wireless network, and setting the state of the predetermined wireless network connected to the image forming apparatus.

The image forming apparatus may also include a user interface unit in which a user can set a connection configuration to switch a connection from a first wireless network to the particular wireless network and conditions to terminate connection of the temporarily-connected wireless network.

BRIEF DESCRIPTION OF THE DRAWINGS

The above and other features and utilities of the present general inventive concept will become more apparent by describing in detail exemplary embodiments thereof with reference to the attached drawings in which.

DETAILED DESCRIPTION OF THE EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
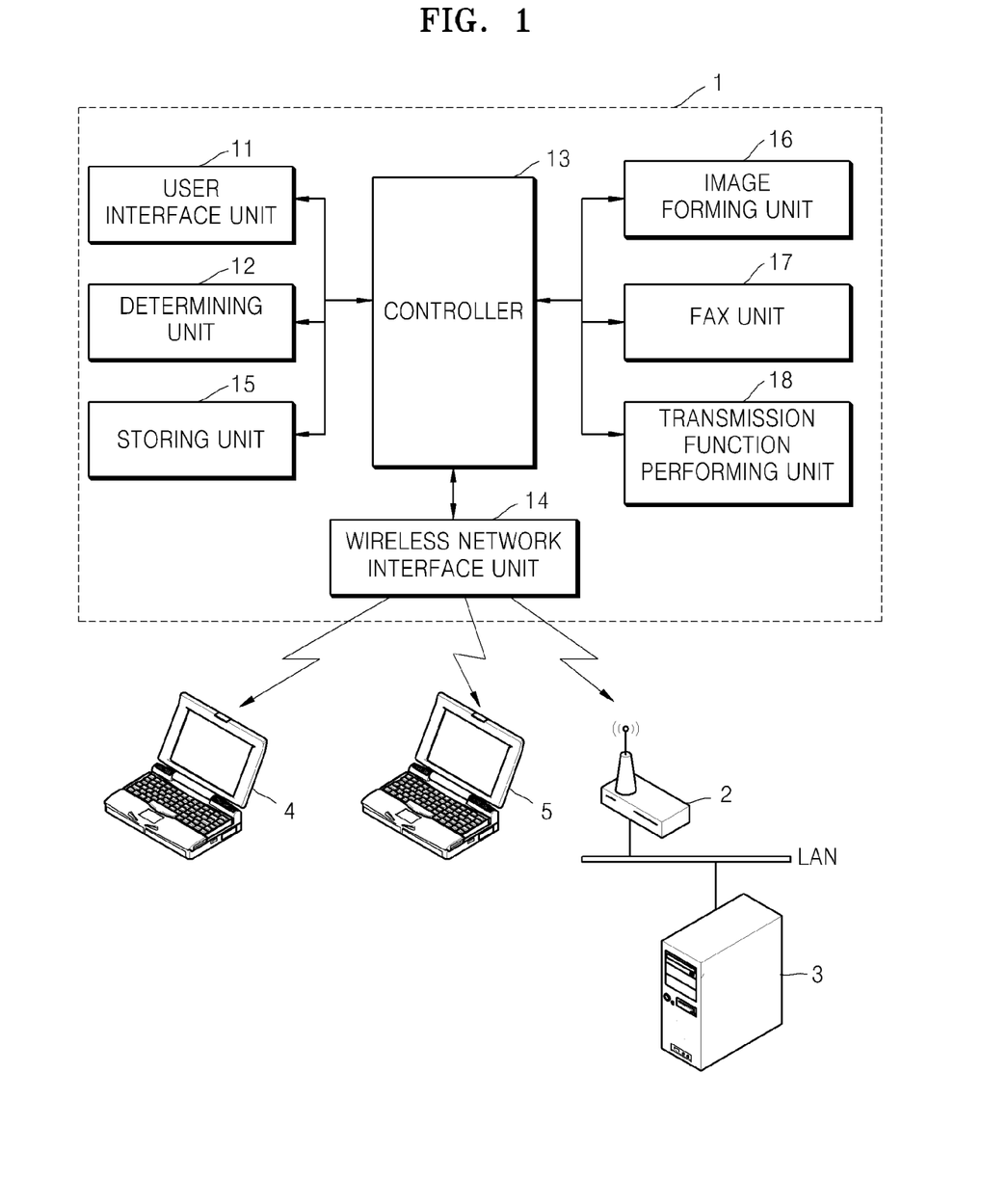
FIG. 1 is a diagram of an image forming apparatus according to an embodiment of the present inventive concept.

FIG. 1 is a diagram of an image forming apparatus 1 according to an embodiment of the present general inventive concept. Referring to FIG. 1, a wireless network communication environment according to the present embodiment includes the image forming apparatus 1, an access point (AP) 2, a host personal computer (PC) 3 that is connectable to the AP 2 via a local area network (LAN), a first notebook computer 4, and a second notebook computer 5. The image forming apparatus 1 may communicate with each of the AP 2, the first notebook computer 4, and the second notebook computer 5 via a wireless network. The AP 2 is a wireless communication device to connect the a wireless network such as a wireless LAN, a Wi-Fi network, a Bluetooth network, or the like.

In particular, in order for the image forming apparatus 1 to communicate with the host PC 3 in the wireless network communication environment of FIG. 1, the image forming apparatus 1 needs to communicate through the AP 2 connected to the host PC 3 via a wired network. Such an operation mode is referred to as an infrastructure mode. The infrastructure mode is a mode in which wireless devices including the image forming apparatus 1 connected to the AP 2 communicate with devices such as the host PC 3, a server, and the like that are in an external wired network, via the AP 2. The infrastructure mode plays a similar role to a general wired network.

On the other hand, an operation mode in which there is no AP 2 and the image forming apparatus 1 directly communicates with the first notebook computer 4 or the second notebook computer 5 in a wireless manner is referred to as an ad-hoc mode. The ad-hoc mode is a peer-to-peer communication mode in which the image forming apparatus 1 is temporarily connected to peripheral wireless network devices and communicates therewith, and is used for local area communication in an internal network. In other words, the image forming apparatus 1 may be connected to the wireless network in the operation mode such as the infrastructure mode or the ad-hoc mode and may transmit and receive data through these different modes.

The image forming apparatus 1 may be connected to the wireless network via the host PC 3 of an administrator and the AP 2. If a user wants to temporarily connect the image forming apparatus 1 to the first notebook computer 4 in the ad-hoc mode, the user needs to change a wireless network setting of the image forming apparatus 1 and connect the image forming apparatus 1 to a different wireless network from the wireless network connected with the host PC 3 so as to perform a desired operation. If the user has completed the operation and does not change the ad-hoc mode, in which the image forming apparatus 1 is temporarily connected to the first notebook computer 4, into the infrastructure mode, in which the image forming apparatus 1 is connected to the host PC 3 of the manager, the temporary connection state of the ad-hoc mode is maintained, and the host PC 3 of the administrator and the image forming apparatus 1 are not connected to each other.

For example, when users share a wireless printer connected in the infrastructure mode in an office, whenever the users want to print pictures stored in a digital camera or a mobile phone, the digital camera or the mobile phone needs to be connected to the wireless printer so as to wirelessly communicate with the wireless printer. Thus, the users need to frequently and temporarily set the wireless printer in the ad-hoc mode and then to frequently change back from the ad-hoc mode to the original infrastructure mode after printing the pictures using the wireless printer. Thus, the users may be inconvenienced by having to switch modes often, and if the users forget to perform this switching back procedure, the host PC 3 of the administrator may not be able to use the wireless printer continuously since it is no longer connected to the wireless printer.

However, when conditions that are set by the administrator or the user are satisfied while the image forming apparatus 1 of FIG. 1 is temporarily connected to the first notebook computer 4 in the ad-hoc mode, the operation mode is automatically changed and the image forming apparatus 1 is connected to the existing wireless network or a new wireless network, and thus the inconvenience may be alleviated. This also applies to the case where the image forming apparatus 1 is temporarily connected to the second notebook computer 5 in the ad-hoc mode. Hereinafter, a structure and operation of the image forming apparatus 1 will be described in detail.

The image forming apparatus 1 includes a user interface unit 11, a determining unit 12, a controller 13, a wireless network interface unit 14, a storing unit 15, an image forming unit 16, a fax unit 17, and a transmission function performing unit 18. Some or all of the elements may be manufactured as separate boards or chips. Some or all of the boards or chips may be manufactured as one board or chip in the form of a system-on-a-chip (SOC).

In order to prevent the features of the present embodiment from being vague, only the elements related to the present embodiment will now be described. Thus, it would be understood by one of ordinary skill in the art that the image forming apparatus 1 may further include other general elements than the elements of FIG. 1.

The image forming apparatus 1 communicates with each of the AP 2, the first notebook computer 4, and the second notebook computer 5 via the wireless network by using the wireless network interface unit 14. In other words, the image forming apparatus 1 is connected to the host PC 3, the first notebook computer 4, or the second notebook computer 5, that is, to at least one external device, via the wireless network by using the wireless network interface unit 14, and may be connected to other external devices via the wireless network. The image forming apparatus 1 is a general multifunctional device that supports at least one of several functions such as copying, faxing, printing, e-mailing, data transmission to the server, and scanning. The general multifunctional device may store, in a storage space of the general multifunctional device, data that is generated when performing the functions, and may send the data by fax, print the data, send the data by e-mail, or send the data to the server at a desired time. The data is transmitted to an external device via the wireless network interface unit 14 of the image forming apparatus 1. Thus, the wireless network interface unit 14 may transmit the data to the AP 2, the first notebook computer 4, or the second notebook computer 5 that is connectable to the image forming apparatus 1 via the wireless network.

Hereinafter, the image forming apparatus 1 of FIG. 1 communicates with the first notebook computer 4 or the second notebook computer 5 while being connected thereto in the temporary ad-hoc mode, and the image forming apparatus 1 of FIG. 1 communicates with the host PC 3 while being connected thereto in the infrastructure mode. However, it would be understood by one of ordinary skill in the art that each of the devices may communicate with each other in other operation modes.

Setting a connection configuration to a wireless network that is to be temporarily and newly connected by the user to the image forming apparatus 1 according to a request of the wireless network is performed in the user interface unit 11 while the image forming apparatus 1 is connected to the existing wireless network. The wireless network to be temporarily connected to the image forming apparatus 1 is a wireless network that is connectable to the previously-described first notebook computer 4 or the second notebook computer 5 in the temporary ad-hoc mode. In the user interface unit 11, setting the connection configuration may be performed by using a touch panel that the user manipulates, such as an operation panel (OPE). In the user interface unit 11, setting the connection configuration may also be performed by using the host PC 3, which is another external device.

More specifically, in the user interface unit 11, setting the connection configuration may be performed by the administrator of the host PC 3 or the user of the first notebook computer 4 or the second notebook computer 5. Setting the connection configuration includes at least one of setting an operation mode of the wireless network interface unit 14 in which the image forming apparatus 1 is temporarily connected to the wireless network; setting conditions for terminating connection of the temporarily-connected wireless network by changing the operation mode; and setting information about a wireless network to be newly connected to the image forming apparatus 1 after the connection of the temporarily-connected wireless network is terminated.

The administrator or the user selects one from among operation modes displayed on the user interface unit 11 and sets the operation mode. The wireless network to be temporarily and newly connected to the image forming apparatus 1 is connected in the ad-hoc mode and thus, the administrator or the user selects an ad-hoc mode from among the operation modes and sets the operation mode as the ad-hoc mode. However, it would be understood by one of ordinary skill in the art that the wireless network to be temporarily and newly connected to the image forming apparatus 1 may also be connected in other operation modes.

After setting of the operation mode is completed, the administrator or the user sets information about at least one of the conditions for changing operation modes displayed on the user interface unit 11. For example, the conditions for changing the operation modes according to the present embodiment include at least one of setting an available time of the image forming apparatus 1 while being connected to the wireless network in the ad-hoc mode; setting the number of pages of a printing medium that can be printed by the image forming apparatus 1; setting a fee that is paid by the user of the wireless network connected to the image forming apparatus 1 in the ad-hoc mode; and setting the state of the wireless network connected to the image forming apparatus 1 in the ad-hoc mode.

When the administrator or the user sets information about the available time of the image forming apparatus 1 among the conditions, in the image forming apparatus 1 connected to the wireless network in the ad-hoc mode, connection of the ad-hoc mode is maintained only within the set available time, and if the set available time has elapsed, connection of the ad-hoc mode is terminated. Similarly, when the administrator or the user sets information about the number of pages of the printing medium that can be printed by the image forming apparatus 1, among the conditions, in the image forming apparatus 1 connected to the wireless network in the ad-hoc mode, connection of the ad-hoc mode is maintained by the set number of printed pages, and the set number of pages may be printed, and an excess number of printed pages may not be printed.

Also, when the administrator or the user sets information about the fee that is paid by the user of the wireless network connected to the image forming apparatus 1 in the ad-hoc mode, among the conditions, the image forming apparatus 1 maintains the connection in the ad-hoc mode as many as an available time, the number of printed pages, or the like corresponded to the fee. Also, when the administrator or the user sets information about the connection state of the wireless network connected to the image forming apparatus 1 in the ad-hoc mode, if failure occurs in the first notebook computer 4 or the second notebook computer 5 of the user connected to the wireless network in the ad-hoc mode and the first notebook computer 4 or the second notebook computer 5 may not be connected to the image forming apparatus 1 in the ad-hoc mode any more, or if the first notebook computer 4 or the second notebook computer 5 may not be connected to the image forming apparatus 1 in the ad-hoc mode while departing from the range where the first notebook computer 4 or the second notebook computer 5 are connected to the image forming apparatus 1 in the ad-hoc mode, connection of the ad-hoc mode to the image forming apparatus 1 is terminated.

Next, after setting information about at least one of the conditions to change operation modes, the administrator or the user sets a wireless network to be newly connected to the image forming apparatus 1 after the connection of the temporarily-connected wireless network displayed on the user interface unit 11 is terminated. The wireless network to be newly connected to the image forming apparatus 1 is the wireless network that has been connected to the image forming apparatus 1 before the image forming apparatus 1 is connected to the wireless network in the temporary ad-hoc mode, or a new wireless network that is different from the wireless network that has been connected to the image forming apparatus 1 in the temporary ad-hoc mode. The new wireless network is connected to the image forming apparatus 1 according to a result of searching for wireless networks that are in the vicinity of the image forming apparatus 1.

If the administrator or the user sets the wireless network that has been previously connected to the image forming apparatus 1 from among wireless networks to be newly connected to the image forming apparatus 1, the image forming apparatus 1 is connected to the wireless network that has been connected to the image forming apparatus 1 before the image forming apparatus 1 is connected to the wireless network in the temporary ad-hoc mode. However, if the administrator or the user sets an address of the new wireless network from among the wireless networks to be newly connected to the image forming apparatus 1, the image forming apparatus 1 is connected to a new wireless network of the address. Also, if the administrator or the user sets to search for wireless networks that are in the vicinity of the image forming apparatus 1 from among wireless networks to be newly connected to the image forming apparatuses 1, the image forming apparatus 1 searches for new wireless networks that are in the vicinity of the image forming apparatus 1 and then becomes connected to the new wireless network according to a result of the searching. The new wireless network connected according to the result of the searching is a wireless network that has the best signal sensitivity or a wireless network in an operation mode that is identical with an operation mode that the administrator or the user wants to connect.

As described above, the administrator or the user sets an operation mode for the user interface unit 11, conditions for changing the operation mode, and a wireless network to be newly connected to the image forming apparatus 1. In this way, the results set in the user interface unit 11 are realized as the set connection configuration for a wireless network to be connected to the image forming apparatus 1 in the temporary ad-hoc mode.

Furthermore, in the user interface unit 11, setting the connection configuration may be performed by the administrator or the user, and results processed by the image forming apparatus 1 may be displayed on the user interface unit 11. In other words, the user interface unit 11 displays the result of searching for the wireless network, i.e., the current state of the wireless network connected to the image forming apparatus 1. For example, if the image forming apparatus 1 is not connected to the wireless network, the result is displayed on the user interface unit 11.

As described above, setting the connection configuration for the temporary ad-hoc mode has been performed while the image forming apparatus 1 is connected to the wireless network in the infrastructure mode. However, the present general inventive concept is not limited thereto, and even while the image forming apparatus 1 is connected to the wireless network in the temporary ad-hoc mode, the user may change the set connection configuration.

The determining unit 12 determines whether connection of the image forming apparatus 1 to the wireless network in the temporary ad-hoc mode is terminated according to the set connection configuration in the user interface unit 11 after the image forming apparatus 1 is connected to the existing wireless network in the temporary ad-hoc mode. In other words, the determining unit 12 determines whether connection of the image forming apparatus 1 to the wireless network in the temporary ad-hoc mode is terminated based on the set connection configuration in the user interface unit 11 after the image forming apparatus 1 is connected to the wireless network in the temporary ad-hoc mode, and information about a wireless network to be newly connected to the image forming apparatus 1.

The determining unit 12 determines whether at least one of the conditions is satisfied while the image forming apparatus 1 is connected to the wireless network in the temporary ad-hoc mode so as to determine whether connection of the image forming apparatus 1 to the wireless network in the temporary ad-hoc mode is terminated, and if it is determined that at least one of the conditions is satisfied, the determining unit 12 determines the already-set information about the wireless network to be newly connected to the image forming apparatus 1. Subsequently, the controller 13 controls so that the image forming apparatus 1 may be connected to the determined wireless network.

More specifically, the determining unit 12 determines the conditions for changing operation modes, i.e., which one of the information about the available time, information about the number of pages of the printing medium that can be printed by the image forming apparatus 1, the information about the fee that is paid by the user of the wireless network connected to the image forming apparatus 1 in the ad-hoc mode, and the information about the state of the wireless network connected to the image forming apparatus 1 in the ad-hoc mode is set in the user interface unit 11.

For example, as a result of the determination performed by the determining unit 12, if the information about the available time and the information about the state of the wireless network connected to the image forming apparatus 1 in the ad-hoc mode are set in the user interface unit 11, the determining unit 12 determines whether the available time has elapsed while the image forming apparatus 1 is connected to the wireless network in the temporary ad-hoc mode or the wireless network connected to the image forming apparatus 1 in the ad-hoc mode may not be connected to the image forming apparatus in the ad-hoc mode any more. If any one of the conditions is satisfied, the image forming apparatus 1 terminates connection in the temporary ad-hoc mode. The operation is also performed when information about other conditions is set in the user interface unit 11.

As a result of the determination performed by the determining unit 12, if the conditions set in the user interface unit 11 are satisfied while the image forming apparatus 1 is connected to the wireless network in the ad-hoc mode, the determining unit 12 determines information about a wireless network to be newly connected to the image forming apparatus 1, wherein the information is set in the user interface unit 11. In other words, the determining unit 12 determines whether the image forming apparatus 1 is to be connected to the previously connected wireless network or is to be connected to the new wireless network.

For example, as a result of the determination performed by the determining unit 12, if the set connection configuration that the image forming apparatus 1 is connected to the previously connected wireless network is performed in the user interface unit 11, the image forming apparatus 1 is connected based on an address of the previously connected wireless network, wherein the address is stored in the storing unit 15. In this case, the wireless network interface unit 14 may change from the temporary ad-hoc mode to the infrastructure mode so that the image forming apparatus 1 may be connected to the previously connected wireless network.

The controller 13 controls so that the image forming apparatus 1 may be connected to the wireless network in the temporary ad-hoc mode according to the set connection configuration in the user interface unit 11, or the image forming apparatus 1 may be connected to a wireless network to be newly connected to the image forming apparatus 1 when connection of the wireless network to the image forming apparatus 1 in the temporary ad-hoc mode is terminated according to the result of the determination performed by the determining unit 12. In other words, if it is determined that at least one of the conditions set in the user interface unit 11 is satisfied, the controller 13 controls so that connection of the wireless network to the image forming apparatus 1 in the temporary ad-hoc mode may be terminated and the image forming apparatus 1 may be newly connected to the wireless network according to the set connection configuration in the user interface unit 11. In this case, the controller 13 controls that the operation mode of the wireless network interface unit 14 is changed and that the image forming apparatus 1 is connected to different wireless networks.

Furthermore, the controller 13 controls the user interface unit 11, the determining unit 12, the storing unit 15, the image forming unit 16, the fax unit 17, and the transmission function performing unit 18, as well as the wireless network interface unit 14.

The wireless network interface unit 14 includes a wireless LAN card that supports connection to a wireless network by using a media access control (MAC) address, an Internet protocol (IP) address or the like. The wireless network interface unit 14 may change from the current operation mode to the ad-hoc mode or the infrastructure mode and is connected to the wireless network by using the operation mode.

The storing unit 15 stores data including the data that is generated by the image forming apparatus 1. For example, the image forming apparatus 1 may store addresses of the previously connected wireless network and may be connected to the previous wireless network by using the stored addresses. In other words, the storing unit 15 stores an address of the previous wireless network, an operation mode in which the image forming apparatus 1 is connected to the previous wireless network, a service set identifier (SSID) of the previous wireless network, and a connection cipher for the previous wireless network, etc.

The image forming unit 16, the fax unit 17, and the transmission function performing unit 18 perform various functions of the image forming apparatus 1 of FIG. 1. The image forming unit 16 performs a printing function of a document file transmitted from the first notebook computer 4 or the second notebook computer 5. The fax unit 17 performs a fax transmission of the document file transmitted from the first notebook computer 4 or the second notebook computer 5. When the wireless network interface unit 14 is connected to the wireless network, the transmission function performing unit 18 performs a transmission of the document file transmitted from the first notebook computer 4 or the second notebook computer 5 to a server and other networks such as a universal serial bus (USB), and a computer system, etc.

Figure 2:
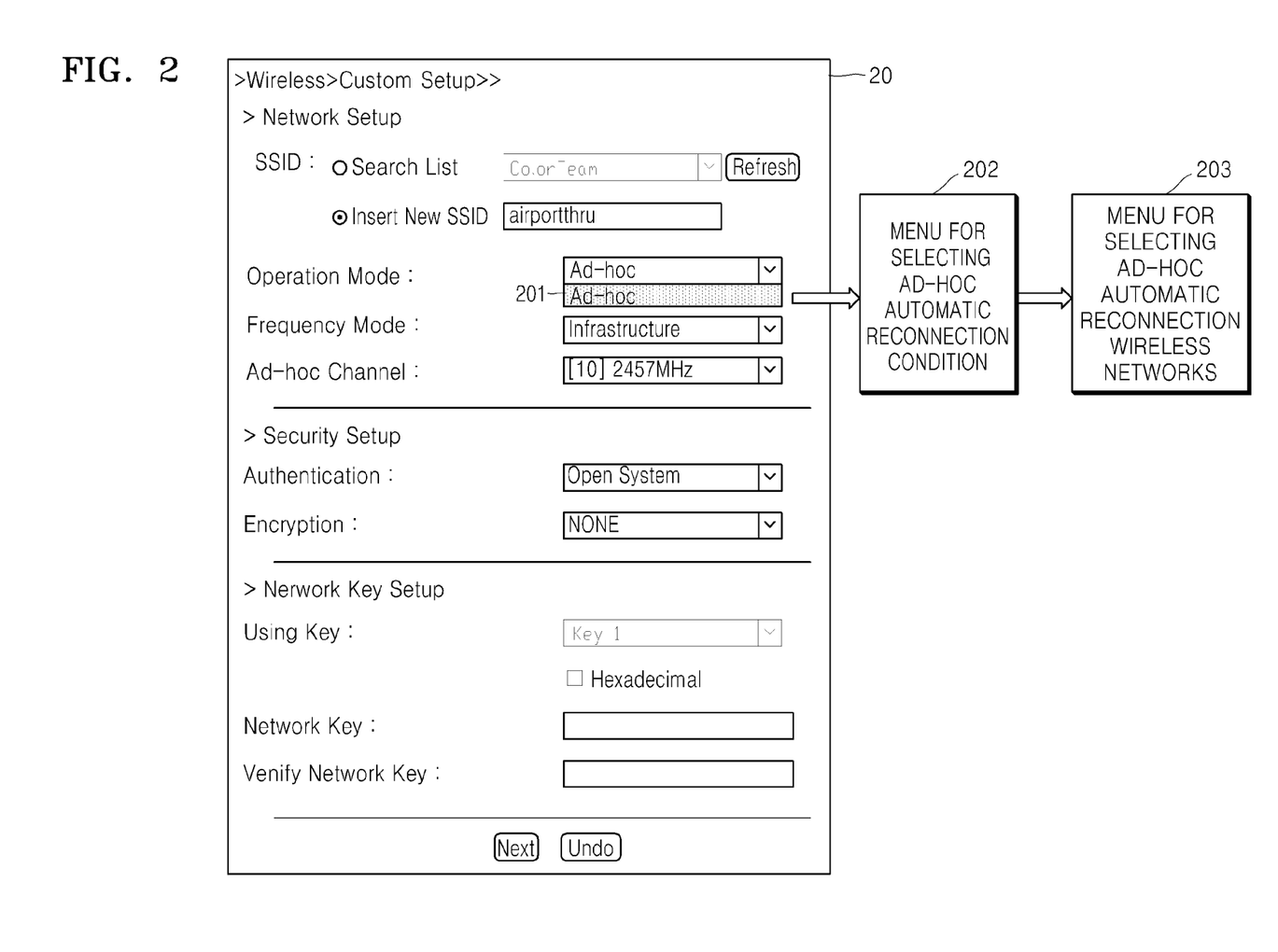
FIG. 2 illustrates a user interface unit according to an embodiment of the present inventive concept.
Figure 3A:
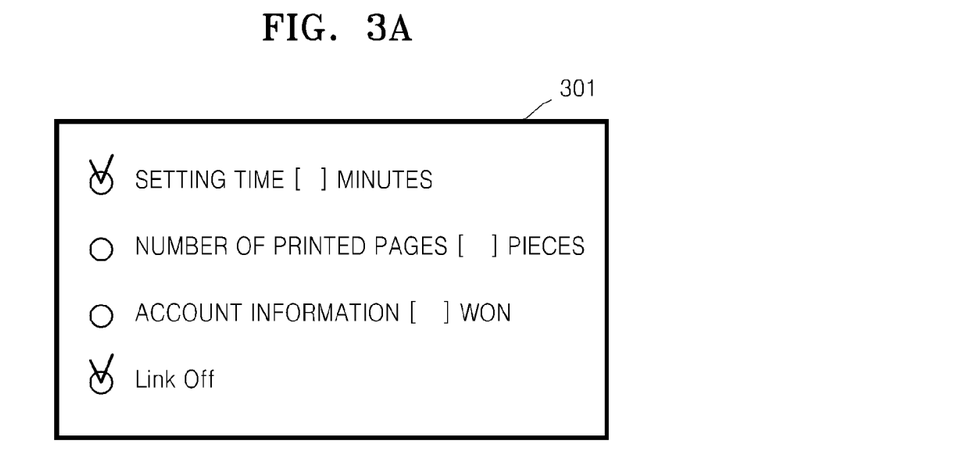
FIGS. 3A and 3B illustrate menus of the user interface unit of FIG. 2 that are to be determined according to selection of operation modes, according to an embodiment of the present inventive concept.
Figure 3B:
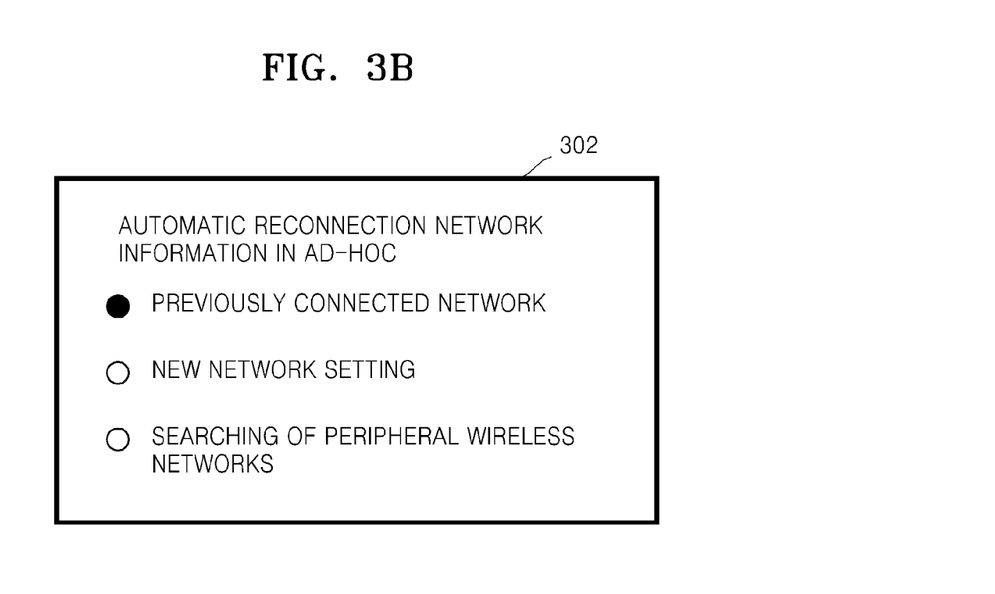

FIG. 2 illustrates a user interface unit 20 according to an embodiment of the present inventive concept. FIGS. 3A and 3B illustrate menus of the user interface unit 20 of FIG. 2 that are to be determined according to selection of operation modes, according to an embodiment of the present inventive concept. In FIGS. 2, 3A, and 3B, a menu 201 for the administrator or the user to select an operation mode, menus 202 and 301 for conditions for changing operation modes, and menus 203 and 302 for wireless networks to be newly connected to the image forming apparatus 1 of FIG. 1 are illustrated.

In detail, referring to the menu 201, the administrator or the user selects an ad-hoc mode from the user interface unit 20 and sets the ad-hoc mode in the user interface unit 20 so as to connect the image forming apparatus 1 of FIG. 1 to a wireless network in a temporary ad-hoc mode. When the ad-hoc mode is selected and set (at menu 201), the menus 202 and 301 that are submenus for selecting ad-hoc automatic reconnection conditions are activated.

The conditions for changing operation modes are shown in the menu 301 of FIG. 3A for selecting the ad-hoc automatic reconnection conditions. In other words, the conditions include information about setting time, the number of printed pages, account information, and link off, and the administrator or the user sets desired information to desired conditions.

For example, the administrator or the user may select and set information about setting time as ten minutes, and simultaneously may select and set link off. Connection of the temporary ad-hoc mode may be maintained only for ten minutes according to the conditions, or when connection of the temporary ad-hoc mode cannot be maintained, connection of the temporary ad-hoc mode is terminated.

Next, if the ad-hoc mode is selected and set (at menu 201) and the information is set from the menus 202 and 301 for selecting the ad-hoc automatic reconnection conditions, the menus 203 and 302 for selecting the ad-hoc automatic reconnection wireless networks, which are submenus of the menus 202 and 301, are activated.

Wireless networks to be newly connected to the image forming apparatus 1 of FIG. 1 after connection of the temporary ad-hoc mode is terminated are shown in the menu 302 of FIG. 3B for selecting the ad-hoc automatic reconnection wireless networks. In other words, the menu 302 includes information such as a previously connected network, new network setting, and searching of peripheral wireless networks. The administrator or the user sets a desired wireless network. For example, if the administrator or the user sets the previously connected wireless network, the image forming apparatus 1 is connected using the address of the previously connected wireless network that is stored in the storing unit 15. In this case, the wireless network interface unit 14 changes from the temporary ad-hoc mode to the infrastructure mode and connects the image forming apparatus 1 of FIG. 1 to the previously connected wireless network in the infrastructure mode.

Figure 4:
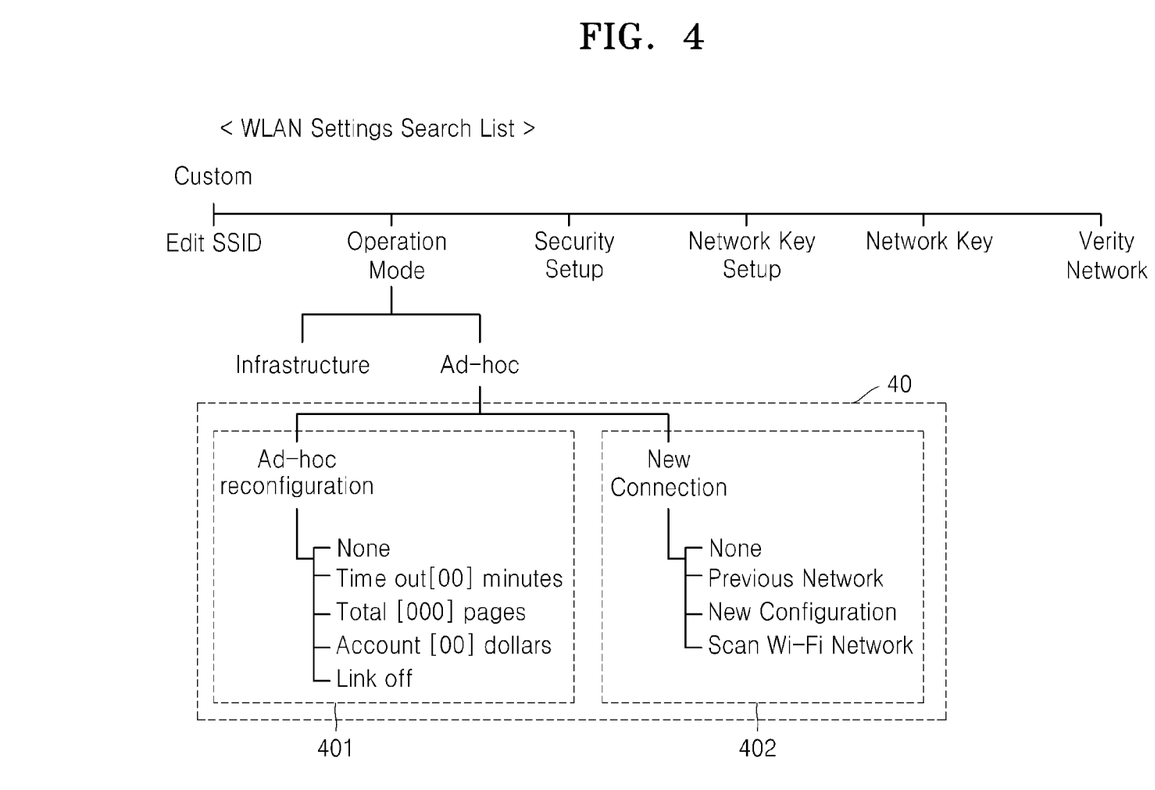
FIG. 4 illustrates a tree structure of the menus of the user interface unit of FIG. 2, according to an embodiment of the present inventive concept.

FIG. 4 illustrates a tree structure of the menus of the user interface unit 20 of FIG. 2, according to an embodiment of the present inventive concept. FIG. 4 illustrates the menus 201, 202, 203, 301, and 302 of the user interface unit 20 of FIG. 2. More specifically, when the administrator or the user sets the operation mode to the ad-hoc mode, a submenu 40 of the menus 201, 202, 203, 301, and 302 of the user interface unit 20 of FIG. 2 is activated. The submenu 40 includes a menu 401 for conditions for changing operation modes and a menu 402 for wireless networks to be newly connected to the image forming apparatus 1 of FIG. 1.

Figure 5:
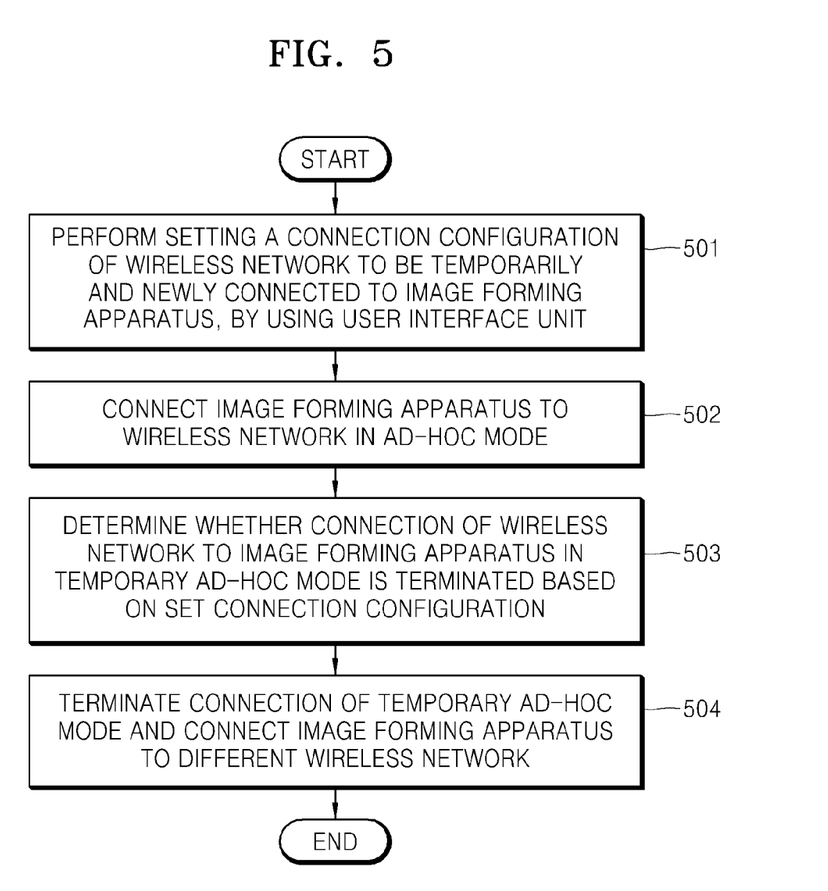
FIG. 5 is a flowchart illustrating a method of controlling wireless network connection in the image forming apparatus of FIG. 1, according to an embodiment of the present inventive concept.

FIG. 5 is a flowchart illustrating a method of controlling a wireless network connection in the image forming apparatus 1 of FIG. 1, according to an embodiment of the present inventive concept. The method of controlling a wireless network connection in the image forming apparatus 1 of FIG. 1, according to the present embodiment, includes operations to be performed according to time in the image forming apparatus 1. Thus, the above-described description of the image forming apparatus 1 of FIG. 1 also applies to the method of FIG. 5.

In Operation 501, the set connection configuration of a wireless network to be temporarily and newly connected to the image forming apparatus 1 of FIG. 1 is performed in the user interface unit 11. The wireless network to be temporarily and newly connected to the image forming apparatus 1 of FIG. 1 is a wireless network to be connected to the image forming apparatus 1 of FIG. 1 in a temporary ad-hoc mode. Setting the connection configuration includes at least one of an operation mode of the wireless network interface unit 14 in which the image forming apparatus 1 is temporarily connected to the wireless network, conditions for terminating connection of the temporarily-connected wireless network by changing the operation mode, and information about a wireless network to be newly connected to the image forming apparatus 1 after the connection of the temporarily-connected wireless network is terminated.

In Operation 502, the controller 13 controls the wireless network interface unit 14 so that the image forming apparatus 1 may be connected to the wireless network in an ad-hoc mode, which is an operation mode included in the set connection configuration.

In Operation 503, the determining unit 12 determines whether connection of the image forming apparatus 1 to the wireless network in the temporary ad-hoc mode is terminated according to the set connection configuration in the user interface unit 11 after the image forming apparatus 1 is connected to the wireless network in the temporary ad-hoc mode, and information about a wireless network to be newly connected to the image forming apparatus 1. In other words, the determining unit 12 determines whether at least one of the conditions for changing operation modes is satisfied while the image forming apparatus 1 is connected to the wireless network in the temporary ad-hoc mode so as to determine whether connection of the image forming apparatus 1 to the wireless network in the temporary ad-hoc mode is terminated. If it is determined that at least one of the conditions is satisfied, the determining unit 12 determines the information about the wireless network to be newly connected to the image forming apparatus 1, wherein the information is already set in the user interface unit 11.

In Operation 504, the controller 13 controls that the operation mode of the wireless network interface unit 14 is changed from the temporary ad-hoc mode to the infrastructure mode and that the image forming apparatus 1 is connected to different wireless networks according to the result of determining performed by the determination unit 12.

Figure 6:
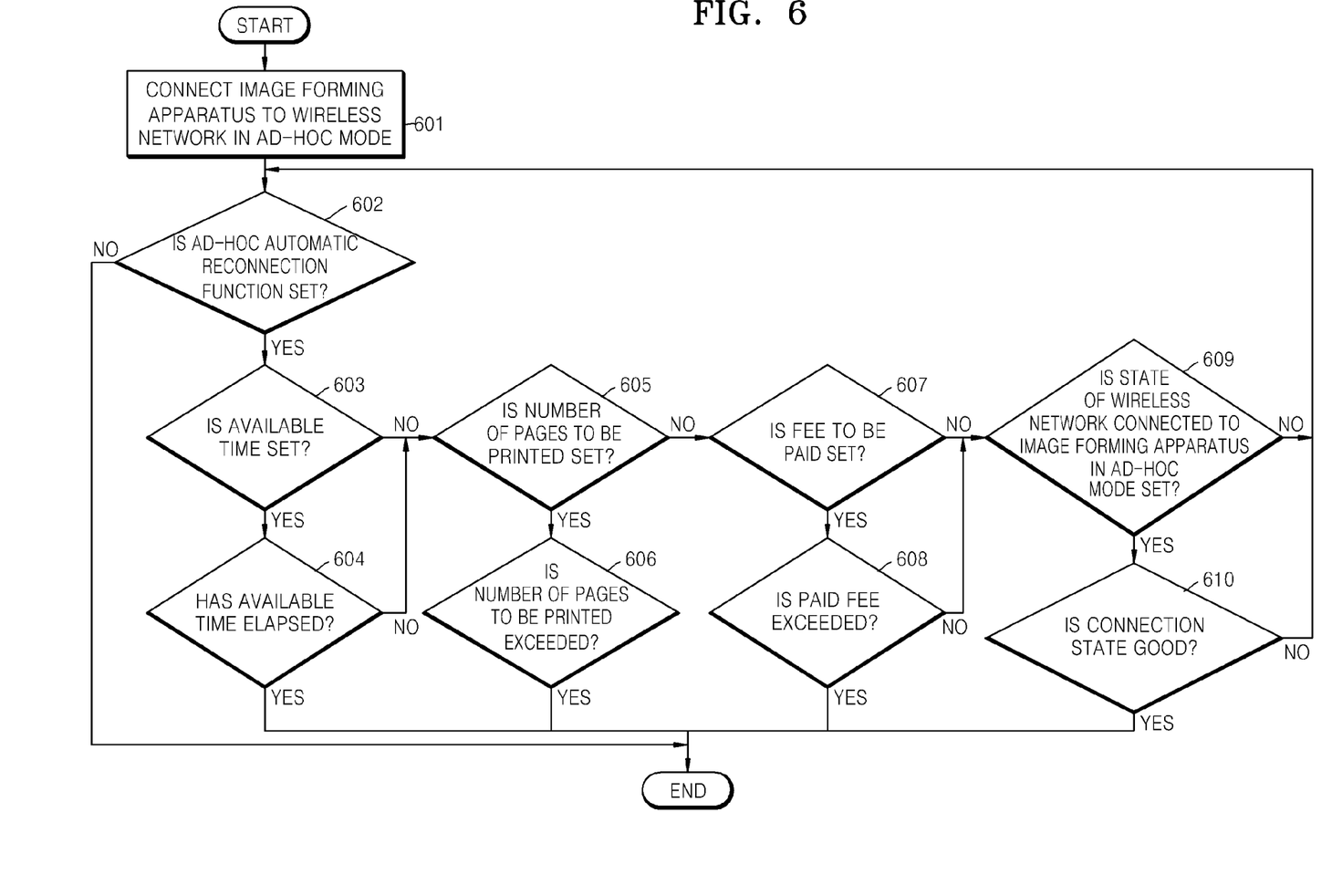
FIG. 6 is a detailed flowchart illustrating an operation of determining conditions to change operation modes to be performed by using a determining unit of the image forming apparatus of FIG. 1, according to an embodiment of the present inventive concept.

FIG. 6 is a detailed flowchart illustrating an operation of determining conditions for changing operation modes to be performed by using the determining unit 12 of FIG. 1, according to an embodiment of the present inventive concept. Referring to FIG. 6, the method of determining conditions for changing operation modes by using the determining unit 12 includes operations to be performed by the determining unit 12 according to time.

In Operation 601, the controller 13 controls the wireless network interface unit 14 so that the image forming apparatus 1 may be connected to the wireless network in an ad-hoc mode, which is an operation mode included in the set connection configuration.

In Operation 602, the determining unit 12 determines whether information about the conditions for changing operation modes is set in the user interface unit 11. If it is determined that the information is set in the user interface unit 11, the determining unit 12 determines whether each of the conditions is satisfied, and if it is determined that any of the conditions are not satisfied, the current connection state is maintained.

In Operation 603, the determining unit 12 determines whether information about an available time is set.

In Operation 604, if it is determined that the information about the available time is set, the determining unit 12 determines whether the available time has elapsed after the image forming apparatus 1 is connected to the wireless network in the temporary ad-hoc mode.

In Operation 605, if it is determined that the information about the available time is not set, the determining unit 12 determines whether information about the number of pages of a printing medium to be printed is set.

In Operation 606, if it is determined that the information about the number of pages of the printing medium to be printed is set, the determining unit 12 determines whether the number of pages of the printing medium to be printed is exceeded after the image forming apparatus 1 is connected to the wireless network in the temporary ad-hoc mode.

In Operation 607, if it is determined that the information about the number of pages of the printing medium to be printed is not set, the determining unit 12 determines whether information about a fee that is paid by the user of the wireless network connected to the image forming apparatus 1 in the ad-hoc mode is set.

In Operation 608, if it is determined that the information about the fee that is paid by the user of the wireless network connected to the image forming apparatus 1 in the ad-hoc mode is set, the determining unit 12 determines whether the fee is exceeded.

In Operation 609, if it is determined that the information about the fee that is paid by the user of the wireless network connected to the image forming apparatus 1 in the ad-hoc mode is not set, the determining unit 12 determines whether information about the state of the wireless network connected to the image forming apparatus 1 in the ad-hoc mode is set.

In Operation 610, if it is determined that the information about the state of the wireless network connected to the image forming apparatus 1 in the ad-hoc mode is set, the determining unit 12 determines whether the state of the wireless network connected to the image forming apparatus 1 in the ad-hoc mode is good.

Figure 7:
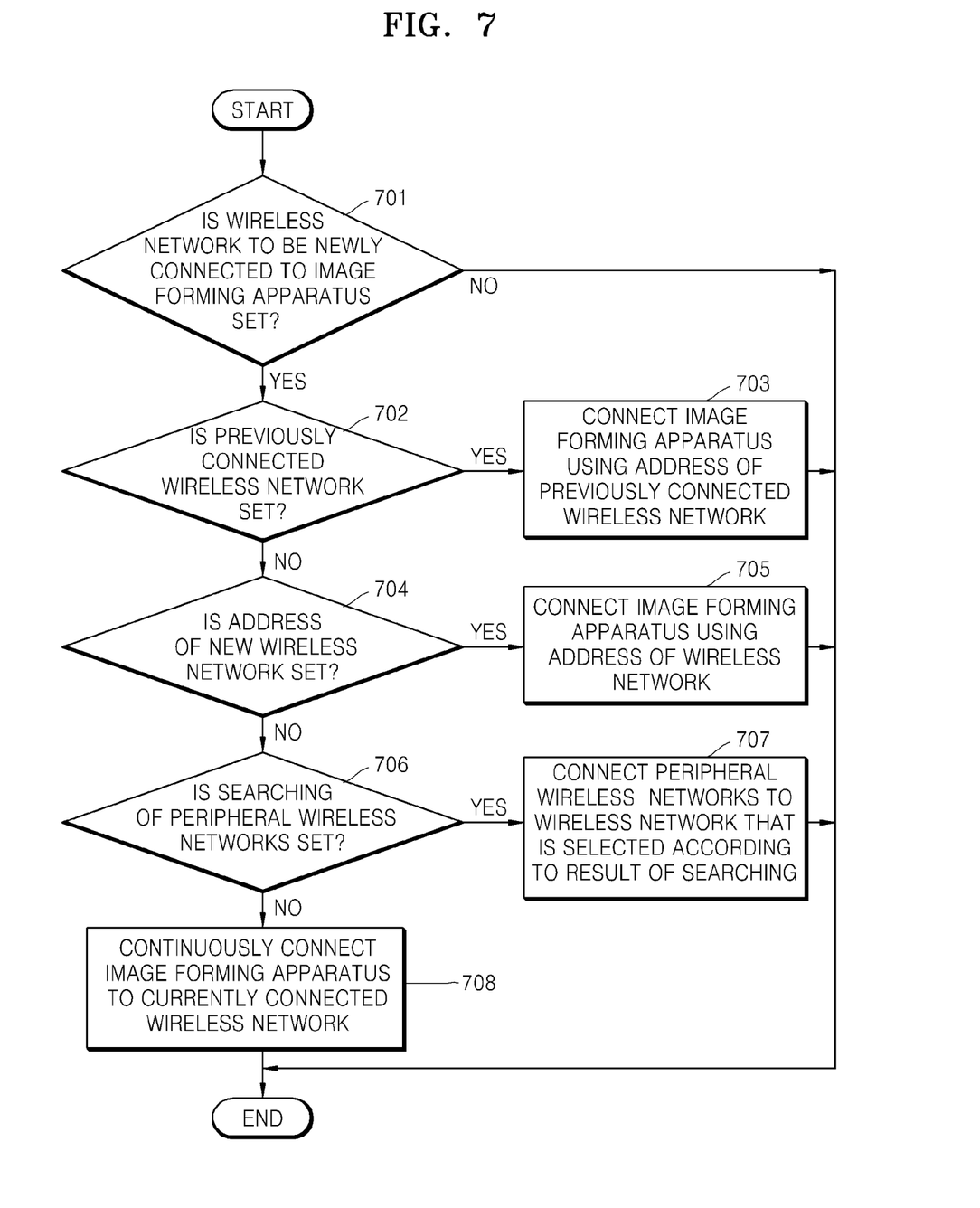
FIG. 7 is a detailed flowchart illustrating an operation of determining a wireless network to be newly connected after connection of a temporary ad-hoc mode is terminated, wherein the operation is to be performed by using the determining unit of the image forming apparatus of FIG. 1, according to an embodiment of the present inventive concept.

FIG. 7 is a detailed flowchart illustrating an operation of determining a wireless network to be newly connected after connection of a temporary ad-hoc mode is terminated, wherein the operation is to be performed by using the determining unit 12 of FIG. 1, according to an embodiment of the present inventive concept. Referring to FIG. 7, the method includes operations to be performed by the determining unit 12 of FIG. 1 according to time, wherein the operations correspond to operations to be performed by the determining unit 12 after Operation 610 of FIG. 6.

In Operation 701, the determining unit 12 determines whether information about a wireless network to be newly connected to the image forming apparatus 1 after connection of a wireless network to the image forming apparatus 1 in a temporary ad-hoc mode is terminated, is set.

In Operation 702, if it is determined that the information about the wireless network to be newly connected to the image forming apparatus 1 is set, the determining unit 12 determines whether the wireless network that has been connected to the image forming apparatus 1 is set before the image forming apparatus 1 is connected to the wireless network in the temporary ad-hoc mode.

In Operation 703, if it is determined that the previously connected wireless network is set, the controller 13 controls so that the image forming apparatus 1 may be connected using an address of the previously connected wireless network, wherein the address is stored in the storing unit 15.

In Operation 704, if it is determined that the previously connected wireless network is not set, the determining unit 12 determines whether an address of a new wireless network is set.

In Operation 705, if it is determined that the address of the new wireless network is set, the controller 13 controls so that the image forming apparatus 1 may be connected using the address of the new wireless network.

In Operation 706, if it is determined that the address of the new wireless network is not set, the determining unit 12 determines whether searching of peripheral wireless networks is set.

In Operation 707, if it is determined that searching of the peripheral wireless networks is set, the controller 13 controls so that the image forming apparatus 1 may be connected to the wireless network that is selected according to a result of searching the peripheral wireless networks. Here, the wireless network that is selected according to the result of searching is a wireless network that has the best signal sensitivity or a wireless network in an operation mode that is identical with an operation mode that the administrator or the user wants to connect.

In Operation 708, if it is determined that searching of the peripheral wireless networks is not set, the controller 13 controls that the image forming apparatus 1 may be continuously connected to the currently connected wireless network.

As described above, after operations such as data transmission and receiving are performed according to conditions that are set by a user while an image forming apparatus is temporarily connected to a wireless network, temporary connection can be terminated, and the image forming apparatus can be automatically connected to an existing wireless network or a wireless network to be newly defined. Thus, the use of the image forming apparatus can be limited to the set conditions so that the image forming apparatus can be efficiently managed. Also, an additional setting operation does not need to be performed to newly connect the image forming apparatus to the wireless network after temporary connection is terminated so that a user's convenience can be improved.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc.

While this present general inventive concept has been particularly shown and described with reference to exemplary embodiments thereof, it will be understood by those of ordinary skill in the art that various changes in form and details may be made therein without departing from the spirit and scope of the general inventive concept as defined by the appended claims. The exemplary embodiments should be considered in a descriptive sense only and not for purposes of limitation. Therefore, the scope of the invention is defined not by the detailed description of the general inventive concept but by the appended claims, and all differences within the scope will be construed as being included in the present general inventive concept.

What is claimed is:

1. An image forming apparatus in which connection of an external device and a wireless network is controlled, the image forming apparatus comprising:
    a wireless network interface unit to connect the image forming apparatus to a first wireless network or a second wireless network;
    a user interface unit in which setting a connection configuration to connect the wireless network interface unit of the image forming apparatus to the second wireless network using an ad-hoc mode according to a request to connect using the ad-hoc mode, the setting being performed while the wireless network interface unit of the image forming apparatus is connected to the first wireless network;
    a determining unit to determine whether a usage of the image forming apparatus corresponds to a terminating condition included in the connection configuration for terminating the connection of the second wireless network using the ad-hoc mode while the wireless network interface unit of the image forming apparatus is connected to the second wireless network, the terminating condition being independent of a state of the connection of the second wireless network and a time of day; and
    a controller to control automatic termination of the connection of the second wireless network using the ad hoc mode when the usage corresponds to the terminating condition and to control automatic connection of the wireless network interface unit of the image forming apparatus to a different wireless network, using an infrastructure mode, from the second wireless network according to the set connection configuration,
    wherein the terminating conditions comprise at least one of the number of pages of a printing medium that can be printed by the image forming apparatus and a fee that is paid by a user of the second wireless network.

2. The image forming apparatus of claim 1, wherein the set connection configuration comprises at least one of an operation mode of the wireless network interface unit in which the image forming apparatus is connected to the second wireless network, the terminating condition for the automatic termination of the second wireless network by changing the operation mode, and information about the different wireless network.

3. The image forming apparatus of claim 2, further comprising:
    a storing unit to store information about the first wireless network, wherein, if the information about the different wireless network corresponds to the information about the first wireless network, the controller controls so that the image forming apparatus is connected to the first wireless network by using the stored information about the first wireless network.

4. The image forming apparatus of claim 3, wherein the information about the first wireless network comprises at least one of an address of the first wireless network, an operation mode in which the image forming apparatus is connected to the first wireless network, a service set identifier (SSID) of the first wireless network, and a connection cipher for the first wireless network.

5. The image forming apparatus of claim 2, wherein the determining unit determines whether the terminating condition is satisfied while the image forming apparatus is connected to the second wireless network so as to determine whether the connection of the second wireless network is automatically terminated, and if it is determined that the terminating condition is satisfied, the determining unit determines the information about the different wireless network, and wherein the controller controls so that the image forming apparatus is connected to the different wireless network.

6. An image forming apparatus in which connection of an external device and a wireless network is controlled, the image forming apparatus comprising:
    a wireless network interface unit to connect the image forming apparatus to a first wireless network or a second wireless network;
    a user interface unit in which setting a connection configuration to connect the image forming apparatus to the second wireless network according to a request to connect to the second wireless network is performed while the image forming apparatus is connected to the first wireless network;
    a determining unit to determine whether a usage of the image forming apparatus corresponds to terminating conditions included in the connection configuration for terminating the connection of the second wireless network while the image forming apparatus is connected to the second wireless network, the terminating conditions being independent of a state of the connection of the second wireless network and a time of day; and a controller to control terminating the connection of the second wireless network when the usage corresponds to the terminating conditions and to control connecting the image forming apparatus to a different wireless network from the second wireless network according to the set connection configuration, wherein the set connection configuration comprises at least one of an operation mode of the wireless network interface unit in which the image forming apparatus is connected to the second wireless network, the terminating conditions for terminating connection of the second wireless network by changing the operation mode, and information about the different wireless network, and wherein the terminating conditions comprise at least one of the number of pages of a printing medium that can be printed by the image forming apparatus and a fee that is paid by a user of the second wireless network.

7. The image forming apparatus of claim 1, wherein the different wireless network comprises at least one of the first wireless network and a new wireless network that is neither of the first wireless network and the second wireless network.

8. The image forming apparatus of claim 7, wherein, if the new wireless network is set in the set connection configuration, the wireless network interface unit searches for the new wireless network that is in the vicinity of the image forming apparatus.

9. The image forming apparatus of claim 1, wherein the set connection configuration is changeable while the image forming apparatus is connected to the second wireless network.

10. A method of controlling a wireless network connection in an image forming apparatus in which connection of an external device and a wireless network is controlled, the method comprising:

connecting a wireless network interface unit of the image forming apparatus to a first wireless network;

performing setting a connection configuration to connect the wireless network interface unit of the image forming apparatus to a second wireless network using an ad-hoc mode according to a request to connect using the ad-hoc mode;

terminating the connection of the first wireless network according to the set connection configuration and connecting the wireless network interface unit of the image forming apparatus to the second wireless network using the ad-hoc mode;

determining whether a usage of the image forming apparatus corresponds to terminating condition included in the connection configuration for terminating the connection of the second wireless network using the ad-hoc mode while the wireless network interface unit of the image forming apparatus is connected to the second wireless network, the terminating condition being independent of a state of the connection of the second wireless network and a time of day; and if the usage corresponds to the terminating condition, automatically controlling terminating the connection of the second wireless network using the ad-hoc mode and automatically connecting the wireless network interface unit of the image forming apparatus to a different wireless network, using an infrastructure mode, from the second wireless network according to the set connection configuration, wherein the terminating conditions comprise at least one of the number of pages of a printing medium that can be printed by the image forming apparatus and a fee that is paid by a user of the second wireless network.

11. The method of claim 10, wherein the set connection configuration comprises at least one of an operation mode of the wireless network interface unit in which the image forming apparatus is connected to the second wireless network, the terminating condition for terminating connection of the second wireless network by changing the operation mode, and information about the different wireless network.

12. The method of claim 11, further comprising:

storing information about the first wireless network, wherein the connecting of the image forming apparatus to the different wireless network comprises, if the information about the different wireless network corresponds to the information about the first wireless network, connecting the image forming apparatus to the first wireless network by using the stored information about the first wireless network.

13. The method of claim 12, wherein the information about the first wireless network comprises at least one of an address of the first wireless network, an operation mode in which the image forming apparatus is connected to the first wireless network, a service set identifier (SSID) of the first wireless network, and a connection cipher for the first wireless network.

14. The method of claim 11, wherein the determining of whether the usage corresponds to the terminating condition comprises determining whether the terminating condition is satisfied while the image forming apparatus is connected to the second wireless network so as to determine whether the connection of the second wireless network is terminated, and if it is determined that the terminating condition is satisfied, then determining the information about the different wireless network, and wherein the connecting of the image forming apparatus to the different wireless network comprises connecting the image forming apparatus to the different wireless network.

15. The method of claim 10, wherein the different wireless network comprises at least one of the first wireless network and a new wireless network that is neither of the first wireless network and the second wireless network.

16. The method of claim 15, further comprising, if the new wireless network is set in the set connection configuration, searching for the new wireless network that is in the vicinity of the image forming apparatus.

17. The method of claim 10, wherein the set connection configuration is changeable while the image forming apparatus is connected to the second wireless network.

18. The method of claim 10, wherein the performing of setting the connection configuration comprises performing setting the connection configuration by using at least one of a user interface unit of the image forming apparatus and the external device.

* * * * *